Nov. 24, 1959     W. E. BAKER     2,913,904
MECHANICAL TRANSDUCERS
Filed July 22, 1953     3 Sheets—Sheet 1
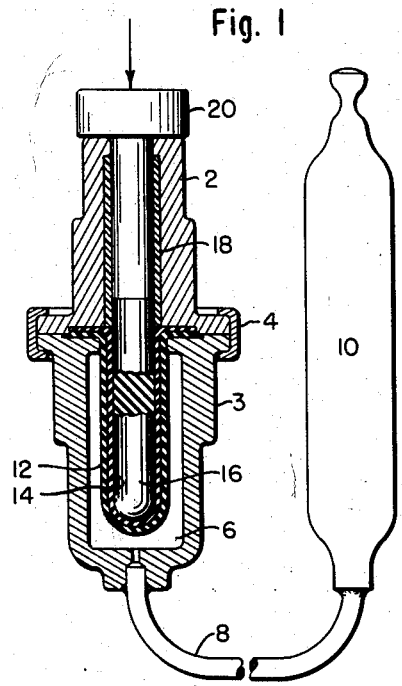
INVENTOR.
WILLIAM E. BAKER
BY
ATTORNEYS Nov. 24, 1959  W. E. BAKER  2,913,904
MECHANICAL TRANSDUCERS
Filed July 22, 1953  3 Sheets-Sheet 2

INVENTOR.
WILLIAM E. BAKER

ATTORNEYS

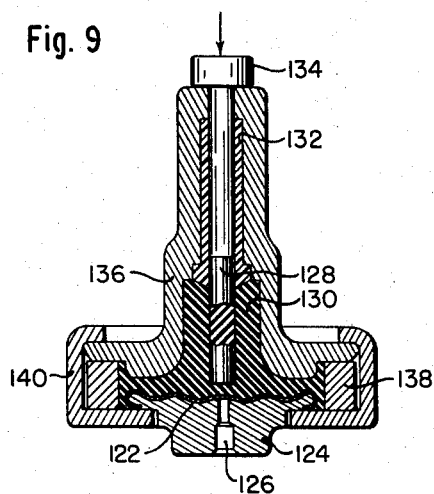
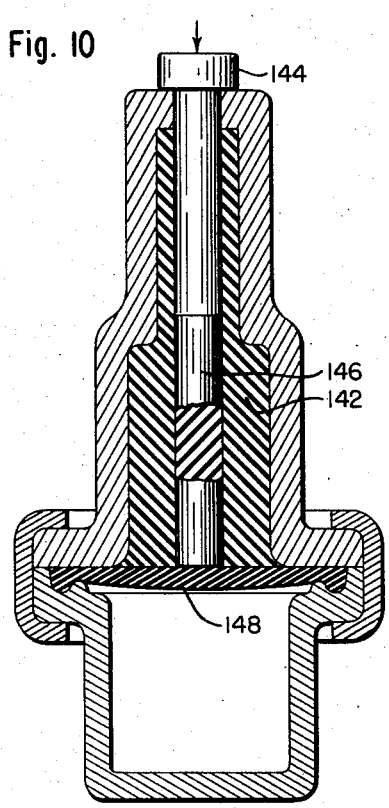
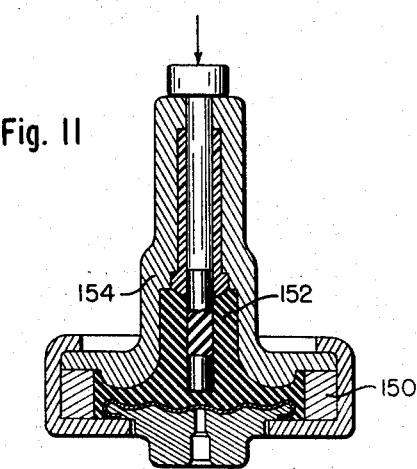
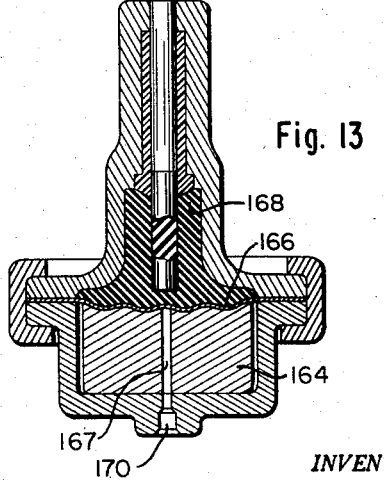
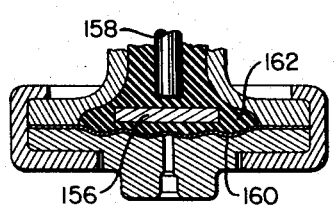

United States Patent Office 2,913,904
Patented Nov. 24, 1959

2,913,904

MECHANICAL TRANSDUCERS

William E. Baker, Wellesley, Mass., assignor to Standard-Thomson Corporation, Boston, Mass., a corporation of Delaware Application July 22, 1953, Serial No. 369,699

7 Claims. (Cl. 73—368.3)

The present invention relates to mechanical energy transducers, and more particularly to a device for moving a pin or other actuator element in response to an internal pressure change.

Such devices are suitable for a wide variety of applications such as thermostatic and pressure responsive controls. Devices of the former type are similar in structure and function to those of the latter type if adapted to the use of a thermally expansible medium, either forming an integral part of the device or disposed remotely and connected thereto through capillary tubing.

By reason of the relatively small movement which a thermally expansible medium can produce by direct action upon a piston, diaphragm, or other moving part, it is ordinarily necessary or desirable to provide means for amplifying this motion. This may be accomplished by an energy transducer having connection with the variable source of pressure and with the element or part to be actuated. This invention has reference to mechanical transducers wherein no energy is derived from external sources, the motion being obtained solely in conjunction with the transfer of energy between the said element and the pressure transmitting medium.

In the mechanical forms of transducers, it is common to provide a support member within which a pin, rod, shaft, or other suitable actuator element is movable in response to an internal force or pressure. The element may act as a piston, or it may be moved by another element, either connected to it in some fashion, or bearing upon it. A cavity or space is usually provided within the support for a flowable pressure transmitting medium, this space being bounded by movable means responsive to the pressure and adapted to transmit motion directly or indirectly to the actuator element.

Although the foregoing structure is simple in outline, there are numerous difficulties in providing an uncomplicated and reliable embodiment at relatively low cost, without sacrifice in service expectancy. One of the greatest of these is in forming an effective seal between the pressure transmitting medium and the movable parts adjacent to it. If insufficiently supported, the seal is likely to burst if the pressure becomes excessive. Thus, particularly in the case of elastomeric seals such as diaphragms and the like, it is desirable, if possible, to utilize the elastic properties of the seal without subjecting it to pressure differentials of an excessive nature. It has also been found that prolonged periods of stress tend to disintegrate rubber and many rubber substitutes, whereby if such materials are held in stress during storage their useful life is progressively reduced even during the period of non-use.

Another difficulty is encountered in the use of a seal adapted to telescope or fold upon itself. Unless properly guided, the seal may fold improperly and thus form wrinkles which build up high local stresses tending to shorten its life. Also, the folds may have a cohesive tendency that would render the response of the device sluggish or erratic.

Still other difficulties are introduced by friction between the parts, and by sticking together of the parts, especially those in sliding contact. It has been found in many cases, for example, that when rubber or a rubber-like material is held firmly in contact with metal it tends to adhere. This is especially noted after long periods of non-use, as in storage. After such periods, it is found that the adhesion is often so strong as to render the device partially or completely inoperative. In any case, the calibration of the device is adversely affected in storage, by reason of the resultant temporary or permanent change in the response characteristic.

It is accordingly an object of the present invention to provide a mechanical energy transducer or actuator of uncomplicated structure in which the requisite degree of displacement of a pin or similar member may be accomplished reliably through a pressure change to which the device is subjected.

A second object is to provide a structure in which adhesion and cohesion of the parts are eliminated as factors tending to limit operativeness or to vary the response characteristic.

A further object is to provide a device of the above type which is adapted to a greater degree of miniaturization for a given degree of actuator displacement than has heretofore been possible in similar devices.

A still further object is to provide a device in which the force necessary to return the pin from an advanced position is small relative to the thrust available to advance the pin.

Other objects are to provide a device in which the parts are not held under internal stress during non-use, and in which the ambient temperature may be compensated for.

With the above objects in view, a feature of this invention resides in a solidly filled structure including a resilient rod disposed within a cavity in the support in position to bear upon an actuator pin. The rod is surrounded by a deformable substance to which the input pressure is applied either by an internal or external force. If an external force is applied to the deformable substance, it may be applied either directly or through an appropriate seal. The displacement of the deformable substance resulting from the pressure causes it to constrict the resilient rod, and the constriction causes the rod to elongate, and to propel the pin. Upon a reduction in applied pressure, the pin is returned because of the resilient properties of the rod, with very little external force applied. Throughout the entire range of applied pressures no void spaces are created since all of the available space is filled by the thermal material, the deformable substance and the rod.

The invention may be adapted for use either as a pressure responsive device or as a thermostatic control device in which thermal material is either incorporated directly into the unit, or connected remotely to it through capillary tubing or equivalent connections. It is adapted to be built in small scale and to incorporate ambient temperature compensating means. It may be so constructed that the parts are not under stress in storage; nor does prolonged storage tend to affect the operability or response characteristic of the device.

Other features and objects of the invention relate to certain structures, arrangements of the parts, combinations and features which will be more clearly understood from the following description, and which are specifically defined in the claims.

The drawings represent only a few of the many possible embodiments of the invention, and are intended primarily to serve as illustrations thereof.

In the drawings,

Fig. 1 is an elevation in section showing a form adapted for use as a remotely controlled thermostatic actuator;

Fig. 2 is a similar view of a variant adapted for an integrally contained thermal fill;

Fig. 3 shows a variant in which the thermal fill is completely enclosed within an elastomeric casing;

Fig. 4 shows a device in which the resilient rod bears directly upon the support at one end;

Fig. 9 shows a remotely controlled unit having means for ambient temperature correction, and also having a bearing sleeve for the actuator pin;

Fig. 10 is a thermostatic unit in which the deformable constrictor substance and the bearing sleeve for the pin are formed as an integral unit;

Fig. 11 shows a second form of ambient temperature compensation;

Fig. 12 shows a third form of ambient temperature compensation; and

Fig. 13 shows a fourth form of ambient temperature compensation.

Figure 5:
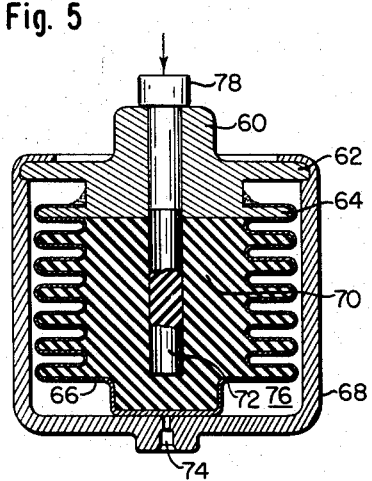
Fig. 5 shows a variant employing a metallic bellows as a seal.

Referring to Fig. 1, one form of remotely controlled thermostatic unit according to the invention may include an outer support member consisting of an upper housing 2 and a lower housing 3 firmly secured together by a locking or connector ring 4. The lower housing defines an inner space or cavity 6, communicating at the lower end through an appropriate fitting with a capillary tube 8 which extends to a remote thermostatic bulb 10 in the usual manner.

Secured between the upper and lower housing are a pair of elastic constrictor sleeves 12 and 14, each sleeve being of cylindrical form and having an open, flanged end and a closed end. Within the sleeves is placed a resilient rod 16, also of rubber or similar elastomeric material, the rod being of cylindrical shape with a rounded end portion fitting closely to the inner sleeve 14. The rod extends partially into a bore in the upper housing 2 which is provided with an anti-friction lining 18. A pin 20 is received into the upper housing and bears against the rod 16. In each of the figures herein, the arrow represents any appropriate external resilient means, such as a spring, which normally presses downwardly upon the pin with sufficient pressure to hold it in constant contact with the rod.

As above stated, the sleeves 12 and 14 are each constructed of an elastomeric material. The inner sleeve 14 and the lining 18 are preferably fabricated of materials having minimum tendency to adhere to the pin 20 and the rod 16, and minimum friction therewith.

The cavity 6 is entirely filled with a flowable material, whereby the cavity, the capillary tube 8, and the thermal bulb 10 form a continuous, completely filled space.

In operation, an increase in the pressure in the cavity due to expansion of thermal material in the bulb 10 causes the sleeves 12 and 14 to be compressed radially and to exert a lateral constriction upon the rod 16. The pressure also exerts a direct axial thrust upon the rod, thereby imparting to the upper end of the rod a longitudinal motion derived partly from the movement of the lower end as well as from the longitudinal elongation caused by constriction. The lateral constriction of the rod produces a considerable elastic, longitudinal extension or extrusion thereof at the upper end. Thus, the rod bears upon the pin and moves it upwardly through a distance corresponding to the degree of pressure applied. As above stated, the rod is constructed of a resilient material such as rubber or a rubber-like material which is incompressible, and which becomes longitudinally extended to compensate for the decrease in radius due to lateral constriction. It should be noted that no void space is created within the unit under any pressure conditions within the range of operation of the device.

The lining 18, being mostly in sliding contact with the pin 20, is preferably fabricated of a material which does not adhere to the pin; whereas, the sleeve 14 is fabricated of a material having low affinity for the rod 16. The pin may be of metal, in which case an inert substance such as Teflon (a plastic consisting of polymerized tetrafluoroethylene) may be employed for the lining; or, the pin 20 may itself be constructed of an inert material and the sleeve dispensed with, since the housing 2, being preferably constructed of metal, will not adhere to the pin. Another alternative is to coat a metal pin with an inert substance such as Teflon.

Fig. 2 shows an actuator in which the thermal material is incorporated into the structure proper. As in the case of Fig. 1, an upper housing 22 is joined to a lower housing 24 by an annular locking ring 26 to form a support member defining a cavity 28. In place of the sleeves 12 and 14 of Fig. 1, a single constrictor element 30 is secured within the cavity by a flange suitably compressed between flanged portions of the housings 22 and 24. The constrictor is preferably formed of an elastomeric material, and has a central hole or recess into which a resilient rod 32 is received. The rod 32 extends partially into a bore in the upper housing 22 and bears against a pin 34.

The operaton of the device is similar to that of Fig. 1. The balance of the cavity 28 surrounding the deformable constrictor is completely filled with a suitable thermal material which expands upon an increase in temperature and transmits pressure through the constrictor to compress the rod 32 laterally and to bear upon it axially, thereby causing it to extend upwardly into the bore in the housing 22.

It is thus seen that the constrictor acts essentially as a volumetric displacement transmitting medium. Like the rod 32, it is practically incompressible, whereby the volumetric changes caused by compression of its external periphery adjacent to the thermal material produce a corresponding reduction in volume of the portion of the rod extending into the constrictor.

In Fig. 3 the thermal material is completely confined within an annular space and is surrounded by an elastomeric seal. The upper housing 36 is joined to the lower housing 38 by an inturned flange in the lower housing. The support member thus formed defines a doughnut-shaped cavity, and centrally supports a resilient rod 40 which bears against the base of the cavity at the lower end and against a pin 42 at the upper end.

The balance of the space within the cavity is completely filled by a thermally expansible capsule having deformable walls 44 entirely enclosing a space 46 filled with thermal material. As an alternative, this type of structure may be adapted for remote control by appropriate fittings connecting the space 46 with a pressure inlet.

As above noted, in this embodiment the rod 40 bears directly against the lower housing. If desired, it may be bonded directly to it in a suitable manner, thereby insuring correct location of the rod and preventing it from being moved out of alignment with the pin 42. In this case, the movement of the upper end of the rod resulting from an increase in applied pressure is derived exclusively from lateral constriction, since the lower end is constrained from moving axially.

Fig. 4 is similar to Fig. 3 in that it includes a resilient rod 48 bearing against the lower housing. In this embodiment, the upper housing 50 and the lower housing 52 are held together by an inturned flange portion of the lower housing, and then welded or soldered at 54. The cavity thus defined is almost entirely filled by the rod 48 and a spool-shaped elastic constrictor 56 surrounding and closely fitting the rod. The small annular space 57 surrounding the constrictor communicates with an external pressure source through a port 58, which is provided with suitable fittings, not shown.

Fig. 5 illustrates a form of the invention in which a metallic bellows is used to form a seal between the deformable constrictor and the pressure transmitting medium. An upper housing 60 is provided with a pair of flanges 62 and 64, the flange 64 being of reduced outside diameter and being shaped to receive the end fold of a bellows 66. When fully assembled, the bellows is closed at its lower end, and welded or soldered to the flange 64 at the upper end to form an hermetic seal. The lower housing 68 is attached to the flange 62, and may also be sealed thereto as shown in Fig. 4 or in any other suitable manner.

A deformable constrictor 70, preferably of rubber, is molded into the bellows 66 so as to leave a central hole when it solidifies. A resilient rod 72 is received into the hole as in the previously described embodiments. A remote pressure source is connected to the unit at a port 74.

Upon application of pressure, preferably by admission of a fluid to the space 76 surrounding the bellows, the bellows collapses longitudinally and the material 70 causes constriction of the rod 72 and axial movement of its lower end, which propels the pin 78 in a manner similar to that previously described.

It will be noted that in the device shown in Fig. 5 it is not necessary for the deformable substance surrounding the rod to have resilience. Since it is completely sealed and confined, it may be a flowable material, but preferably one having relatively low thermal sensitivity.

Figure 6:
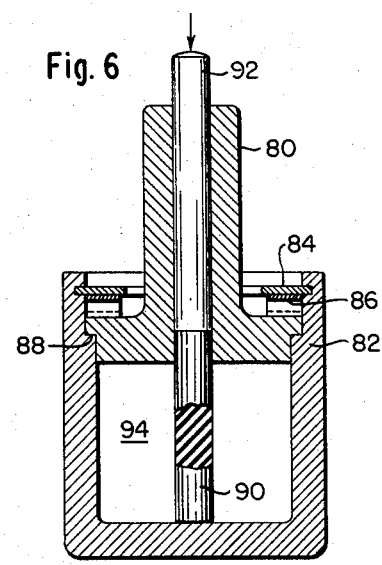
Fig. 6 shows a thermostatic device having means to prevent overtravel of the pin.

Fig. 6 shows an integrally contained thermal actuator having means to prevent overtravel of the actuator pin in the event of an excessive pressure building up within the thermal fill. An upper housing 80 is joined to a lower housing 82 in a flexible manner by means of a snap ring 84 fitting into an annular groove in the housing 82, and a corrugated spring 86 which is held in compression between the housing 80 and the snap ring.

Under normal conditions, the spring holds the upper housing firmly against the lower housing, causing the former to bear upon an annular shoulder 88 in the latter. A resilient rod 90 bears against the base of the lower housing at one end and against a pin 92 at the other end. A thermal material 94 completely fills the space surrounding the rod 90. The operation of the device is very similar to that of Fig. 4 throughout the normal range of pressures. However, when the force of the thermal material upon the upper housing 80 becomes equal to the force exerted by the spring 86, the upper housing begins to yield upwardly and to relieve the pressure. In this way, overtravel of the pin 92 is effectively prevented, and damage to the rod 90 through excessive constriction is also prevented.

It will be noted that, unlike the embodiments of Figs. 1 to 5, the device shown in Fig. 6 has a resilient rod which is acted upon directly by the thermal material. This is in contrast to the indirect method involving an intermediate constrictor sleeve arrangement, as in Fig. 1, or a constrictor element of appreciable thickness as in Fig. 2. In all of these embodiments, the elastic properties of the rod 90 are utilized to force the surrounding material back to its original shape upon a reduction in applied pressure, whether or not such material is inherently elastic. Of course, if the fill 94 is an elastomeric substance it will tend to return to its original shape of its own accord.

Although the upper and lower housings are shown as being flexibly connected to permit the cavity to be expanded, it will be obvious that other arrangements may be devised for expanding the capacity of the cavity while retaining the rigid connection of the upper and lower housings, as in the preceding embodiments. Thus, the cavity may be provided with a slidable piston-like plate forming the lower wall of the space to be filled with thermal material. Below this wall there may be an empty space containing a spring adapted to be compressed to move the plate and thereby to expand the space devoted to the thermal fill. The spring may be arranged to move by distances proportional to the pressure existing in the fill in a uniform manner over the entire range of operation, or only over the range in excess of a predetermined maximum pressure, as in the described embodiment.

Figure 7:
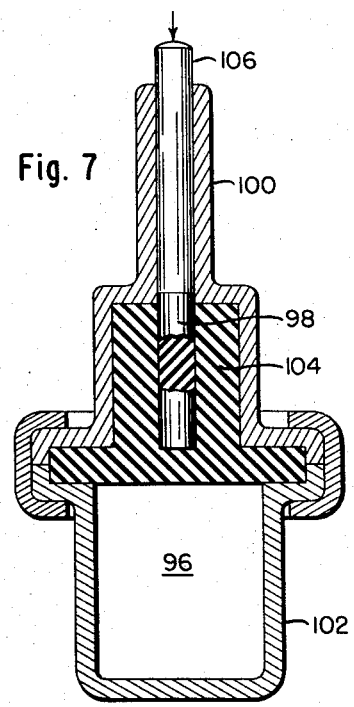
Fig. 7 shows an integral thermostatic unit in which the deformable constrictor acts as a seal and the thermal fill is entirely located below one end of the resilient rod.

In each of the previously described embodiments, part of the pressure transmitting medium surrounds the sides of the resilient rod. In Fig. 7 the pressure transmitting medium, which is a thermal fill in the space 96, is disposed entirely below the end of the resilient rod 98. In other respects, this embodiment resembles that of Fig. 2. Thus, a cavity is formed by an upper housing 100 and a lower housing 102, the lower housing being filled with the thermal material and the upper housing containing the deformable constrictor 104. As in Fig. 2, the constrictor also acts as a seal between the thermal material and the rod. Here, as in the embodiment of Fig. 2, the movement of the pin 106 is derived partly from the constriction of the rod 98 by the material 104, and partly from axial movement of the lower end of the rod.

Figure 8:
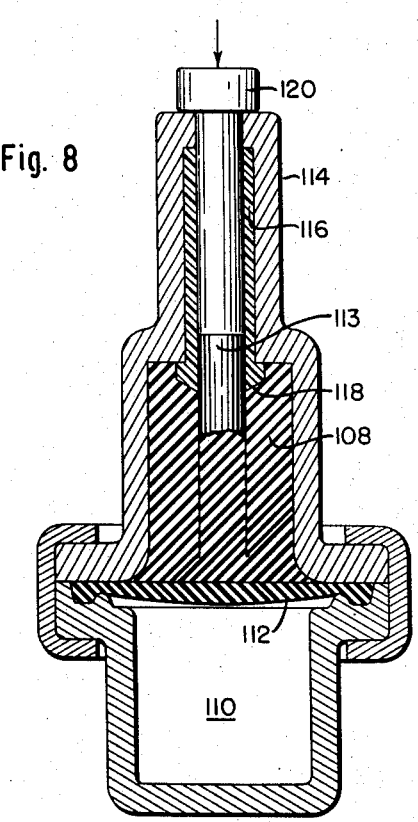
Fig. 8 shows a thermostatic unit in which the rod and the surrounding constrictor substance are formed as an integral unit.

Fig. 8 shows several variants of the actuator, which may be employed in combination or selectively in the other embodiments herein described.

The structure in general arrangement is similar to that of Fig. 7. However, the constrictor 108 is separated from the thermal material in the space 110 by a flexible diaphragm 112, which is preferably made of rubber or other suitable elastomeric material. By this means, contact between the pressure transmitting medium and the constrictor is eliminated, and it becomes possible to use for the constrictor deformable materials which would be attacked by the fill, or which would not serve inherently as an effective seal for the fill.

The constrictor 108 and the rod 113 in this embodiment are fabricated as an integral unit having a cylindrical slit formed in a mold or cut into it. This unit may be molded in a single operation; or, the rod may be molded of one material and the constrictor of another preferably more deformable material, these parts being then bonded together at the lower extremity of the rod so as to produce an integral unit of the general conformation illustrated in the figure.

The upper housing 114 is provided with a sleeve insert 116 which extends downwardly into the cavity formed by the upper and lower housings, and has a specially formed flanged end with an outwardly extending and backwardly directed end wall 118. As in the embodiment of Fig. 1, the insert 116 serves to reduce friction and sticking between the upper housing and the pin 120. However, the wall 118 of the insert serves an additional purpose, namely to minimize localized stresses in, and consequent crumbling of, the rod 113 adjacent to the place where the rod enters the sleeve. The nature of the stresses built up in various portions of the constrictor element and in the rod are a function of the amount and distribution of the pressures applied to the constrictor, the shape of the constrictor, and the strength, deformability and resiliency of the rod and constrictor. Thus, the exact angle of rake of the wall 118 is controlled with these factors in mind, and in any case it should be such that the local pressure in the constrictor adjacent to the end of the sleeve is reduced sufficiently to prevent it from tending to enter the sleeve.

In Fig. 9 the seal or diaphragm takes the form of a corrugated metal seal 122 which is secured at its edges, by any suitable means such as welding or soldering, to a lower housing 124. The housing 124 is preferably constructed of metal, and has an upper surface corrugated to match the corrugations of the seal 122. Pressure is applied from a remote source through a port 126. A resilient rod 128 and a deformable constrictor 130 are provided as in the preceding embodiments. An insert 132 similar to that of Fig. 8 is also preferably provided.

It will be observed that when the seal 122 is firmly pressed against the base 124 further increases in pressure within the unit are not transmitted through the port 126 to the source of pressure. Or conversely, if a substantial external force is applied downwardly to the pin 134 when the seal is against the base 124, the pressure at 126 will have to build up to a value sufficient to overcome this force before the unit will begin to function. A unit is thus provided which begins to function by constriction of the rod only after a minimum pressure is reached, in contrast to the embodiment of Fig. 6, in which the unit functions at lower pressures, but ceases to function for pressures above a predetermined maximum value. It will be obvious that these two devices may be combined to produce a unit which functions only within a predetermined range of applied pressures.

Fig. 9 also illustrates one means of compensating for the effects of ambient temperature. An increase in temperature will cause the upper housing 136, which may be made of brass, for example, to expand slightly, thereby increasing the volume of the cavity. On the other hand, when an elastomeric material such as rubber is employed as the constrictor, the thermal expansion of the constrictor exceeds that of the casing, thereby causing further constriction of the rod 128 which may be undesirable, especially where the device is to be remotely controlled.

Accordingly, means are provided to further expand the volume of the cavity. To this end, an aluminum ring or lining 138 is fitted within the cavity and surrounds and retains the deformable constrictor, leaving a small annular space between the ring and the connector or locking ring 140 which holds the upper and lower housings together. The ring 138 has a relatively high temperature coefficient as compared with the housing, and is rigid in structure. Upon an increase in temperature the ring expands in both inner and outer diameters and moves closer to the connector 140, thereby creating an additional annular space and tending to relieve the pressure. It will be readily apparent that other materials may be used to produce the foregoing effect. Also, it will be seen that by proper adjustment of the dimensions of the casing and ring 138 having in mind the materials selected therefor, it is possible to compensate substantially or completely for thermal effects.

Fig. 10 shows an embodiment which may be compared with that of Fig. 8. Here, the constrictor 142 is integral with the sleeve surrounding the pin 144, thus serving not only to constrict the resilient rod 146 but also as a bearing for the pin. Because of the reduced dimensions of the portion surrounding the pin, the pressure transmitted thereto is relatively small. The end of the resilient rod bears directly upon the elastic seal or diaphragm 148, and may be bonded to it, if desired. Alternatively, the rod and seal may be molded or otherwise formed as a single integral unit.

The embodiment of Fig. 11 is generally similar to that of Fig. 9, but illustrates a second form of ambient temperature compensation. In this embodiment an annular ring 150 is placed within the cavity and completely fills an annular space surrounding the deformable constrictor 152. The ring 150 is preferably fabricated of a material with a temperature coefficient lower than that of the constrictor 152. Suitable low coefficient materials are well known, and are usually either metallic or ceramic. By adjusting the volumetric proportions of the ring 150 and constrictor 152, it is possible to achieve a combination in which the total volumetric thermal expansion is offset by the corresponding expansion of the casing 154.

Fig. 12 illustrates another form based upon the same principle as Fig. 11. Here, the low expansion material 156 is placed between the deformable rod 158 and the corrugated diaphragm 160.

Fig. 13 shows a device operating generally upon the same principle as that of Figs. 11 and 12. In this case, the low expansion material 164 is located within an extended portion of the cavity below the corrugated diaphragm 166. The pressure connection is preferably made through a channel 167 in the material 164. The "cavity" is considered as including both the portion filled by the constrictor 168 and that filled by the material 164. Thermal expansion of the walls of this cavity is arranged by proper choice of relative volumes to compensate exactly or as closely as desired for the total thermal expansion of the materials contained within it. The diaphragm 166, being flexible, moves to adjust for changes in the relative volumes occupied by the constrictor 168 and material 164. These changes due to fluctuations in the ambient temperature are carried out automatically, without appreciable effect upon the response of the device to the pressure communicated to it through the port 170.

It will be observed that many of the features of the devices heretofore described may be combined in other ways to meet the needs of particular applications. Also, a wide choice of materials is available, particularly with respect to the thermal fill, the pressure transmitting medium, the constrictor and the resilient rod. For the thermal material, it is possible to use liquids, gases, wax, or other substances which undergo volumetric changes either before, during, or after a change of state has taken place. Also, thermal expansion of a solid may be utilized, in which case it is preferable to cause the solid to bear directly against the constrictor or against a diaphragm which in turn bears against the constrictor. However, remote thermal expansion of a solid may also be utilized to actuate the device, by transmission of the dimensional movement through a fluid in a well-known manner.

As indicated above, the force exerted upon the constrictor whether caused by thermal effects or otherwise, may be produced in various ways, as by a gas under pressure, a liquid under pressure, or by a mechanical movement.

It will also be seen that a device constructed according to this invention may be used in many ways as a means of control, measurement, or conversion of energy. It is possible, by reversal of action of the device, to generate a large hydraulic pressure by means of a small axial load on the pin. Similarly, it is possible to transmit a large axial pin displacement remotely. It is possible to transmit mechanical energy remotely. It is also possible to convert heat energy into mechanical energy, through the intermediate step of a pressure change.

As mentioned earlier, the material selected for the constrictor is necessarily deformable, but may or may not be subject to plastic flow. If the constrictor is directly in contact with the pressure transmitting medium, it is preferably an elastomer, but where a diaphragm is employed to separate the constrictor from the transmitting medium, the constrictor may be flowable.

It will be obvious to those skilled in this art that careful attention should be given to the lubricants employed, both to eliminate friction and to reduce wear. Lubrication between the resilient rod and the constrictor is particularly important, and may take the form of a bleeding fluid lubricant such as oil, graphite, or a silicon product, or of an applied lubricant, either fluid or dry in form.

Also, a wide variety of methods and procedures of construction may be employed. These include various molding, bonding, sealing, and other procedures which are well known in the fabrication of such devices.

It will be understood that variations of form, design, and construction may be incorporated into any of the devices heretofore described by way of illustrative embodiments, in accordance with the presently known skills and techniques of the art, without departing from the spirit or scope of the invention.

Having thus described the invention, I claim:

1. A pressure-responsive actuator having, in combination, a rigid housing defining a space, including an elongated hollow cylindrical portion, a sleeve bearing in said portion, an elongated rod-like elastomeric member extending partially into the bearing and partially into said space, a rigid pin received in the bearing and abutting an end of said member, a body of elastomeric material situated in contact with the sides and end of said member extending into said space, and means to apply pressure to said body to constrict said member laterally, said member elongating longitudinally and causing the pin to slide in the bearing.

2. A pressure-responsive actuator having, in combination, a rigid housing defining a space, including an elongated hollow cylindrical portion, a sleeve bearing in said portion, an elongated rod-like elastomeric member extending partially into the bearing and partially into said space, a rigid pin received in the bearing and abutting an end of said member, a body of elastomeric material situated in contact with the sides and end of said member extending into said space, and a flowable thermal fill in contact with said body to apply pressure thereto to constrict said member laterally, said member elongating longitudinally and causing the pin to slide in the bearing.

3. A pressure-responsive actuator having, in combination, a rigid housing defining a space, including an elongated hollow cylindrical portion, a sleeve bearing in said portion, a flexible diaphragm enclosing said space within the housing, an elongated rod-like elastomeric member extending partially into the bearing and partially into said space, a rigid pin received in the bearing and abutting an end of said member, a body of elastomeric material situated in contact with the sides and end of said member extending into said space and substantially filling said space, and means to apply pressure to said body through the diaphragm, said body constricting said member laterally and said member elongating longitudinally and causing the pin to slide in the bearing.

4. A pressure-responsive actuator having, in combination, a rigid housing defining a space, including an elongated hollow cylindrical portion, a sleeve bearing in said portion, a flexible metal diaphragm enclosing said space within the housing, an elongated rod-like elastomeric member extending partially into the bearing and partially into said space, a rigid pin received in the bearing and abutting an end of said member, a body of elastomeric material situated in contact with the sides and end of said member extending into said space and substantially filling said space, and an hermetically sealed metallic system completely filled with a flowable thermal material and having the diaphragm as a wall thereof, said system applying pressure to said body through the diaphragm, said body constricting said member laterally and said member elongating longitudinally and causing the pin to slide in the bearing.

5. A pressure-responsive actuator having, in combination, a rigid housing defining a space, including an elongated hollow cylindrical portion, a sleeve bearing in said portion, a metallic bellows having a closed end and enclosing said space within the housing, an elongated rod-like elastomeric member extending partially into the bearing and partially into said space, a rigid pin received in the bearing and abutting an end of said member, a body of elastomeric material situated in contact with the sides and end of said member extending into said space and substantially filling said space, and an hermetically sealed metallic system completely filled with a flowable thermal material and having the bellows as a wall thereof, said system applying pressure to said body through the bellows, said body constricting said member laterally and said member elongating longitudinally and causing the pin to slide in the bearing.

6. A pressure-responsive actuator having, in combination, a rigid housing defining a space, including an elongated hollow cylindrical portion, a sleeve bearing in said portion, a generally flat flexible metallic diaphragm enclosing said space within the housing, an elongated rod-like elastomeric member extending partially into the bearing and partially into said space, the longitudinal dimension of said member being substantially at right angles to the general plane of the diaphragm, a rigid pin received in the bearing and abutting an end of said member, a body of elastomeric material situated in contact with the sides and end of said member extending into said space and substantially filling said space, and an hermetically sealed metallic system completely filled with a flowable thermal material and having the diaphragm as a wall thereof, said system applying pressure to said body through the diaphragm, said body constricting said member laterally and said member elongating longitudinally and causing the pin to slide in the bearing.

7. A pressure-responsive actuator having, in combination, a rigid housing defining a space, including an elongated hollow cylindrical portion, a sleeve bearing in said portion, a generally flat flexible metallic diaphragm enclosing said space within the housing, an elongated rod-like elastomeric member extending partially into the bearing and partially into said space, the longitudinal dimension of said member being substantially at right angles to the general plane of the diaphragm, a rigid pin received in the bearing and abutting an end of said member, a body of elastomeric material situated in contact with the sides and end of said member extending into said space and substantially filling said space, an hermetically sealed metallic system completely filled with a flowable thermal material and having the diaphragm as a wall thereof, said system applying pressure to said body through the diaphragm, said body constricting said member laterally and said member elongating longitudinally and causing the pin to slide in the bearing, and means responsive to the ambient temperature for variably expanding the wall of the housing to vary said space to oppose the effect of variations in said temperature on the position of the pin.

References Cited in the file of this patent

UNITED STATES PATENTS

| | | |
|---|---|---|
| 1,995,385 | Foote | Mar. 26, 1935 |
| 2,208,149 | Vernet | July 16, 1940 |
| 2,368,181 | Vernet | Jan. 30, 1945 |
| 2,453,851 | Miller | Nov. 16, 1948 |
| 2,507,466 | De Craene | May 9, 1950 |
| 2,593,238 | Albright | Apr. 15, 1952 |

FOREIGN PATENTS

| | | |
|---|---|---|
| 531,280 | Great Britain | Jan. 1, 1941 |
| 1,070,788 | France | Feb. 12, 1952 |